United States Patent [19]

Harrold et al.

[11] Patent Number: 5,833,542
[45] Date of Patent: Nov. 10, 1998

[54] TRANSMISSION JOINT SEALING BOOT

[75] Inventors: Richard Harrold, Leonard; Paresh Patel; Gary D. Grabaum, both of Troy, all of Mich.

[73] Assignee: GKN Automotive, Inc., Auburn Hills, Mich.

[21] Appl. No.: 796,785

[22] Filed: Feb. 6, 1997

[51] Int. Cl.$^6$ .................................................. F16D 3/84
[52] U.S. Cl. ..................... 464/175; 277/637; 156/272.4; 464/29; 464/902
[58] Field of Search .............................. 464/29, 175, 173, 464/170, 902; 277/212 FB, 80, 634, 637, 636; 403/50, 270, DIG. 1; 156/272.4, 293

[56] References Cited

U.S. PATENT DOCUMENTS

| | | |
|---|---|---|
| Re. 337,701 | 12/1991 | Triquet . |
| 3,292,957 | 12/1966 | Ulderup . |
| 3,574,031 | 4/1971 | Heller, Jr. et al. ................... 156/272.2 |
| 3,807,195 | 4/1974 | Faulbecker . |
| 3,941,641 | 3/1976 | Heller, Jr. et al. ................... 156/272.4 |
| 4,202,184 | 5/1980 | Krude et al. . |
| 4,493,676 | 1/1985 | Krude ................................. 464/175 X |
| 4,516,959 | 5/1985 | Krude ..................................... 464/175 |
| 4,560,178 | 12/1985 | Hempel ............................... 464/175 X |
| 4,969,968 | 11/1990 | Leatherman ........................ 156/272.4 |
| 5,176,576 | 1/1993 | Moulindt ........................... 277/212 FB |
| 5,295,914 | 3/1994 | Milavec ............................. 277/212 FB |
| 5,419,741 | 5/1995 | Schwartz ............................... 464/175 |

FOREIGN PATENT DOCUMENTS

| | | | |
|---|---|---|---|
| 2661469 | 10/1991 | France .................................. 464/175 |
| 2685749 | 7/1993 | France ............................ 277/212 FB |
| 40-4272514 | 9/1992 | Japan .................................... 464/175 |
| 465341 | 9/1967 | Switzerland ............................ 403/50 |
| 2086534 | 5/1982 | United Kingdom ................... 464/175 |

*Primary Examiner*—Eileen A. Dunn
*Attorney, Agent, or Firm*—Mick A. Nylander

[57] ABSTRACT

A transmission joint sealing boot comprising a flexible diaphragm member having a passageway extending therethrough, a first end defining an opening, an annular second end disposed opposite the first end, a flexible arcuate section connecting the first end and the annular second end of the flexible diaphragm member, the first end further including an inner surface and an outer surface, a bellows member having a passageway extending therethrough, the bellows member including a first end defining an opening, a second end disposed opposite the first end, and an intermediate bellows segment having a convoluted section disposed between the first end and the second end and connecting the first end and the second of the bellows member, wherein the second end defines an opening for receiving the first end of the flexible diaphragm member and the second end further including an inner surface and an outer surface, a magnetically active weld sleeve having an inner surface correspondingly shaped to mate with the outer surface of the first end of the diaphragm member such that the magnetically active weld sleeve is received on and abuts against the outer surface of the first end of the diaphragm member and an outer surface correspondingly shaped to mate with the inner surface of the second end of the bellows member such that the magnetically active weld sleeve and first end of the diaphragm are received within the opening of the bellows member whereby the magnetically active weld sleeve is disposed between the diaphragm member and the bellows member such that when the magnetically active weld is exposed to an electromagnetic field of current, the magnetically active weld sleeve melts and subsequently fuses the diaphragm member, the bellows member and weld sleeve together.

18 Claims, 3 Drawing Sheets

TRANSMISSION JOINT SEALING BOOT

TECHNICAL FIELD

This invention relates to a transmission joint sealing boot for use with a transmission joint and, more particularly, to a transmission joint sealing boot for use with a high speed constant velocity universal joint.

BACKGROUND ART

Transmission joints and constant velocity universal joints in particular, require sufficient lubrication to operate effectively. This lubrication is often provided in the form of a lubrication grease. This lubricating grease is contained around and within the constant velocity universal joint's operating parts. In this manner, transmission joint sealing boots of the kind commonly known in the industry frequently comprise a section for attachment to a first joint member, a second section for attachment to a second joint member and a convoluted section that is disposed between the two sections to accommodate the angular movement of the joint in operation.

Certain transmission joint sealing boot designs have been developed to accommodate different applications of different constant velocity universal joints. In particular, high speed propeller shaft applications often require specific transmission joint sealing boot designs that can accommodate the relatively high revolutions per minute (rpms) generated by the propeller shaft. These sealing boot designs include a convoluted boot section attached directly to the transmission shaft and a diaphragm section attached to the outer race section of the constant velocity universal joint. As this design includes an intricate shape, the boot is often made of a soft neoprene rubber. A soft, flexible material is required because the boot, when made in its present design in a molding operation, requires a folding back on itself to create the appropriate shape. The intricate design, and specifically the diaphragm like section, is not manufacturable in a standard molding operation in its final form. It must be molded in a temporary shape and the end portion folded over on itself to form the final diaphragm portion.

This requirement of manipulation or folding over on itself limits the particular materials that the boot may be manufactured from. Thermoplastic elastomers or TPE's are used in the industry for manufacture of transmission joint sealing boots. High speed transmission boots of this shape are not currently manufactured from a TPE or like materials because the intricate shapes needed are not readily moldable through current molding techniques. A high speed transmission joint boot manufactured from a TPE or like material would provide advantages in stability and pinch resistance.

U.S. Pat. No. 3,807,195 discloses a seal arrangement for a torque-transmitting joint comprising a boot with a large diameter end secured to a first joint member and a smaller diameter end secured to a second joint member. The boot including a curved portion adjacent the large diameter end is supported against the inner surface of the first joint member by an elastic retaining ring. In this arrangement, as disclosed, a plastic retaining ring is vulcanized to the cylindrical outer surface of the boot. The plastic retaining ring also engages on its opposite side, the peripheral surface of the axially extending section of the rigid holder.

DISCLOSURE OF THE INVENTION

The present invention provides a transmission joint sealing boot having a flexible diaphragm member, a bellows member, whereby the magnetically active weld sleeve is disposed between the diaphragm member and the bellows member such that when the magnetically active weld is exposed to an electromagnetic field of current, the magnetically active weld sleeve melts and subsequently fuses the diaphragm member, the bellows member and weld sleeve together.

The present invention also provides a transmission joint sealing boot having a flexible diaphragm member and a bellows member, wherein a magnetically active ring is also received within a circumferential notch of the bellows member whereby the magnetically active weld ring is disposed adjacent the diaphragm member and the bellows member such that when the magnetically active weld ring is exposed to an electromagnetic field of current, the magnetically active weld ring heats up to at least the melting temperature of the diaphragm member and the bellows member and subsequently fuses the diaphragm member and the bellows member together.

The present invention still further provides a flexible diaphragm member and a bellows member wherein a magnetically active weld paste is disposed between the diaphragm member and the bellows member and directly contacts an extending shoulder section and a circumferential notch such that when the magnetically active weld paste is exposed to an electromagnetic field of current, the magnetically active weld paste heats up to at least the melting temperature of the diaphragm member and the bellows member and subsequently fuses the diaphragm member and the bellows member together.

It is an object of the present invention to provide a transmission joint sealing boot of the present invention wherein the magnetically active weld sleeve is manufactured from a polymer including embedded particles of a magnetic material.

It is another object of the present invention to provide a transmission joint sealing boot of the present invention wherein the magnetically active weld ring is a metallic ring such as an iron ring or a stainless steel ring.

BEST MODE FOR CARRYING OUT THE INVENTION

Figure 1:
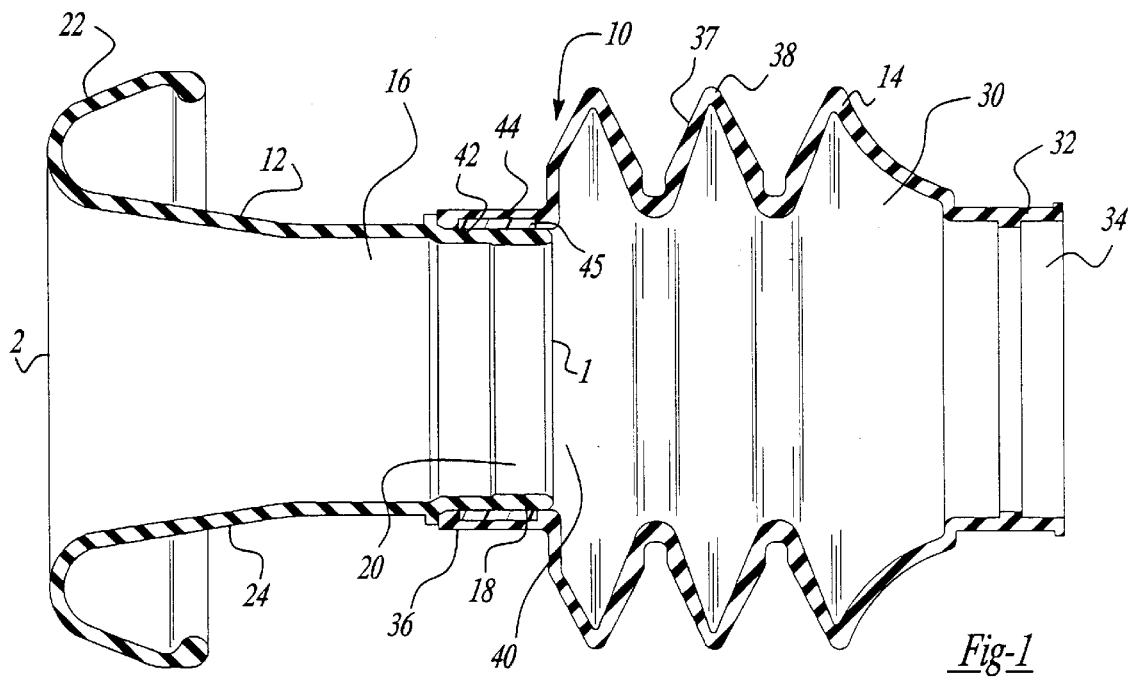
FIG. 1 is a cross sectional view of the transmission joint sealing boot of the present invention.
Figure 2:
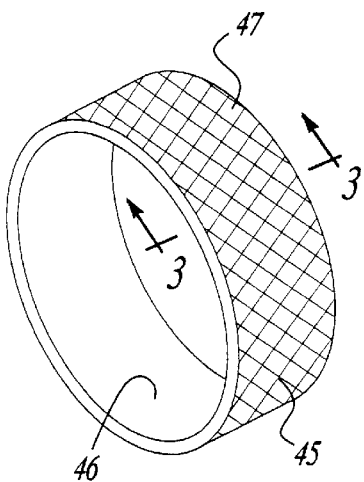
FIG. 2 is a perspective view of the magnetically active weld sleeve of the present invention.
Figure 4:
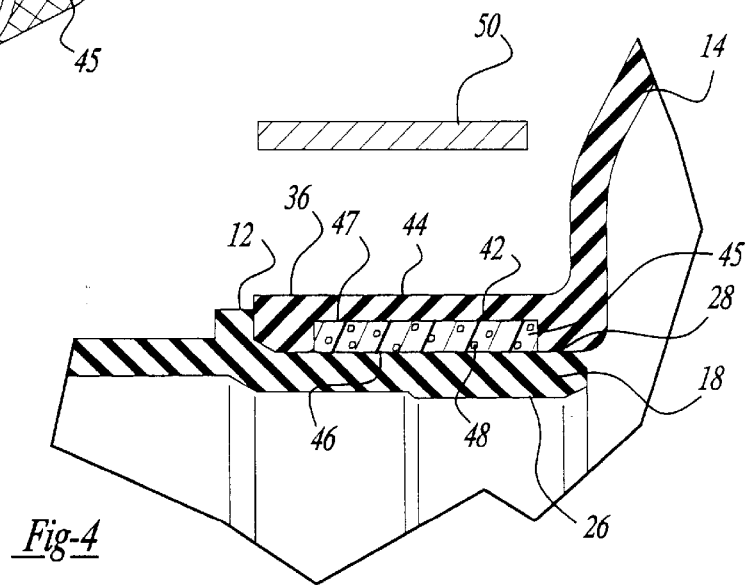
FIG. 4 is an enlarged fragmented view of the transmission joint sealing boot and magnetically active weld sleeve of the present invention.

Referring now to FIG. 1, there is shown generally a transmission joint sealing boot 10, having a flexible diaphragm member 12 and a bellows member 14. The flexible diaphragm member 12 defines a passageway 16. Flexible diaphragm member 12 has a first end 18 further defining an opening 20 and an annular second end 22. Annular second end 22 is disposed opposite first end 18. A flexible arcuate section 24 extends between and connects first end 18 to annular second 22. Referring now to FIG. 4, first end 18 includes an inner cylindrical surface 26 and an outer cylindrical surface 28. As shown in FIG. 1, passageway 16 extends from the opening 20 of first end 18 though the flexible diaphragm member to second annular end 22.

As shown in FIG. 1, bellows member 14 defines a passageway 30. The bellows member 14 includes a first end 32 further defining and opening 34. The bellows member has a second end 36 disposed opposite the first end 32. The bellows member 14 also has an intermediate bellows segment 37 having a convoluted section 38. The convoluted section 38 is disposed between and connects the first end 32 and the second end 36. Second end 36 also defines and opening 40. The opening 40 is designed and shaped to receive the first end 18 of the flexible diaphragm 12. The second end also includes an inner cylindrical surface 42 and an outer cylindrical surface 44.

Referring now to FIGS. 1–4, there is shown a magnetically active weld sleeve 45. The magnetically active weld sleeve 45 has an inner surface 46 which is correspondingly shaped to mate with the outer surface 28 of the first end 18 of the diaphragm member 12. The magnetically active weld sleeve 45 is received on and abuts against the outer surface 28 of the first end 1 8 of the diaphragm member 12. The magnetically active weld sleeve 45 also has an outer surface 47 correspondingly shaped to mate with the inner surface 42 of the second end 36 of the bellows member 14. As shown, the inner surface 42 is recessed within the second end of the bellow member 14 such that the weld sleeve 45 is in direct contact with the inner surface 42.

Figure 3:
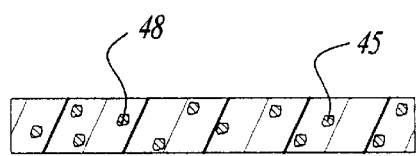
FIG. 3 is a cross sectional view of the magnetically active weld sleeve taken along lines 3—3 of FIG. 2.

In this manner, when operatively connected, as shown in FIGS. 1 and 4, the magnetically active weld sleeve 45 and first end 18 of the diaphragm member 12 are received within the opening 40 of the bellows member 14. The magnetically active weld sleeve 45 is thereby disposed directly between the diaphragm member 12 and the bellows member 14. The magnetically active weld sleeve 45 may be manufactured from a polymeric material having embedded particles of a magnetic material 48 as shown in FIGS. 3 and 4. The magnetic material may be fine particles of iron, stainless steel, or other magnetically active metals. The particles may range in size from 50 microns to 800 microns.

An electromagnetic welding operation is used to complete the transmission joint sealing boot 10. The electromagnetic welding operation utilizes the principles of induction heating to generate a melting or fusion temperature. Specifically, referring now to FIG. 4, a conductive work coil 50 is subjected to a high frequency alternating current. The conductive work coil 50 generates an electromagnetic field of current which subsequently heats the magnetic material 48 in the weld sleeve 45. A melting or fusion temperature is achieved and the magnetically active weld sleeve 45 melts and thereby fuses the abutting diaphragm member 12, magnetically active weld sleeve 45 and bellows member 14 together. It is understood that heat generated within the magnetically active weld sleeve 45 is transferred by conduction to the outer cylindrical surface 28 of the diaphragm member 12 and inner cylindrical surface 42 of the bellows member 12 causing the fusing of the diaphragm member 12, magnetically active weld sleeve 45 and bellows member 14 together.

Electromagnetic welding is particularly advantageous in the present invention because fusion temperatures are reached very quickly and do not create excessive induced stresses in the fused diaphragm member 12, magnetically active weld sleeve 45 and bellows member 14 together. Variations in the magnetically active material 48 such as, the amount of magnetically active material 48, the size of the magnetically active material 48 and the type of magnetically active material 48 all may be used to vary the fusion temperature and cycle time of the assembly.

Upon completion of the electromagnetic welding, a transmission joint sealing boot 10 of the present invention is provided which is manufactured from a thermoplastic elastomer which has the above mentioned advantageous characteristics. It provides these characteristics, which were not possible before due to the molding problems discussed above.

In the present invention, in manufacturing a transmission joint seal for use with a high rpms (revolutions per minute) propshaft constant velocity joint, the diaphragm member 12 and bellows member 14 are preferably manufactured from a thermoplastic elastomer, for example Dupont HYTREL®. This thermoplastic elastomer has many following advantageous characteristics. HYTREL is recyclable, has a higher tensile strength, cut resistance and a quicker cycle time. Thermoplastic elastomers have melting temperatures in a range from 190°–220° celsius.

Figure 9:
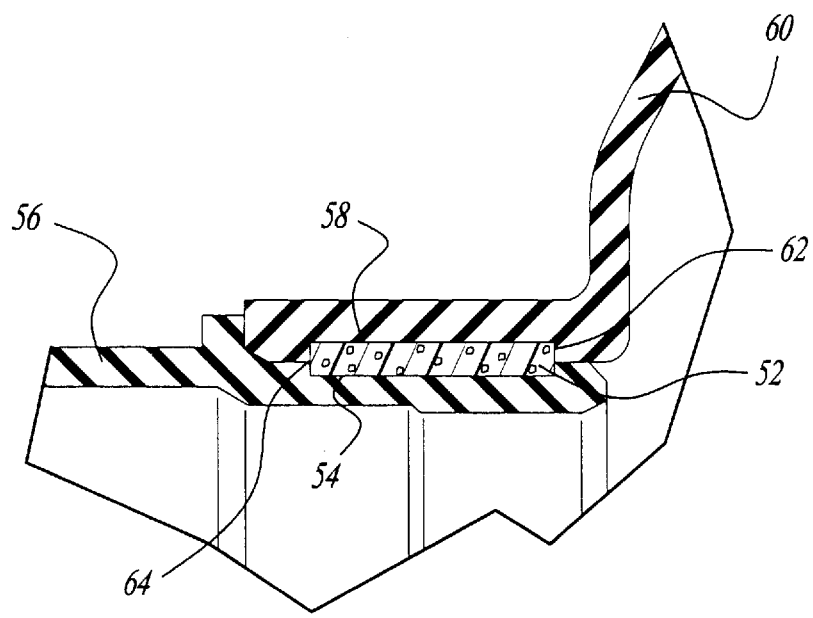
FIG. 9 is a cross sectional view of still another alternative embodiment of the present invention.

Referring now to FIG. 9, there is shown an alternative embodiment of the present invention. In this alternative embodiment, the magnetically active weld sleeve 52 is shown placed within a recess 54 disposed on the flexible diaphragm member 56 and within a recess 58 disposed on the bellows member 60. The recesses 54 and 58 are configured to mate and accept the magnetically active weld sleeve 52 in a press fit fashion. In this manner, appropriate surface contact is made between the recess 54, weld sleeve 52 and recess 58. In operation, the above described alternative embodiment operates in a similar fashion to the operation discussed above. This alternative embodiment does provide a different surface contact outline then the embodiment discussed above in FIG. 4. In this embodiment, more surface contact is made with the diaphragm member 56.

Specifically, the ends 62 and 64 of the weld sleeve 52 are confined in both the recess 54 of the diaphragm member 56 and the recess 58 of the bellow member 60. This contact of the ends 62 and 64 with the recesses 54 and 58 provides a stronger fusion of the diaphragm member 56 and bellows member 60.

Figure 5:
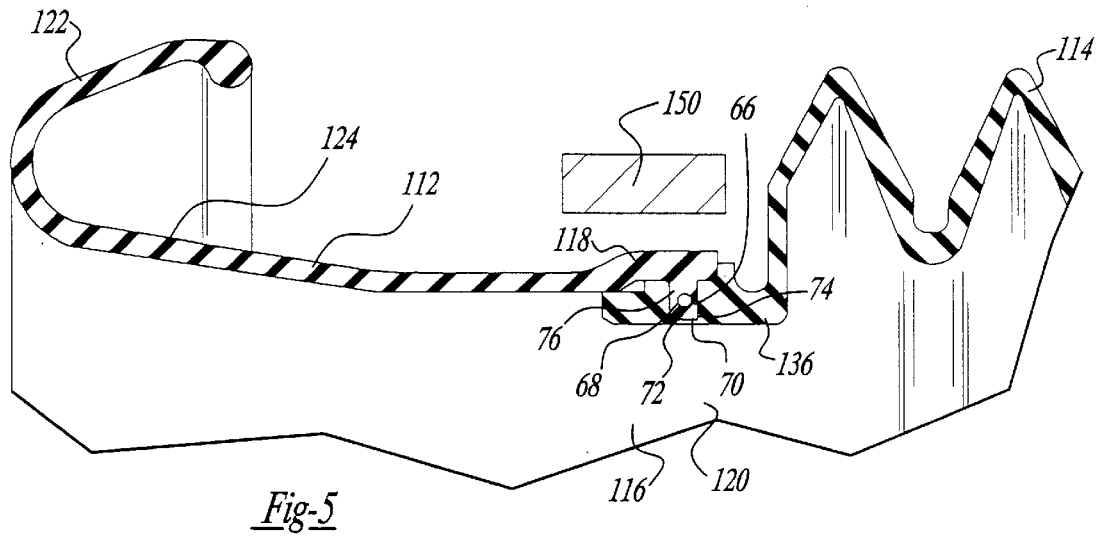
FIG. 5 is a cross sectional view of an alternative embodiment of the present invention.

Referring now to FIG. 5, there is shown yet another alternative embodiment of the present invention. A flexible diaphragm member 112 is shown having a passageway 116 as described previously. The diaphragm member 112 also includes a first end 118 defining an opening 120 and an annular second end 122. A flexible arcuate section 124 connects the first end 18 to the annular second end 122.

The first end 118 also includes an extending shoulder section 66. The extending shoulder section 66 has a generally rectangular cross section. A magnetically active ring 68 is embedded within the extending shoulder section 66. The magnetically active ring extends completely within the extending shoulder section 66. The magnetically active ring may be a manufactured from iron, stainless steel or some other form of magnetically active metallic substance. The magnetically active ring 68 may be molded in place directly during the molding process or molded in any other process that adequately locates and disposes the metallic ring within the extending shoulder section 66.

As shown, in FIG. 5, the bellows member 114 is substantially similar to the bellows member of FIG. 1 except for the following differences. The second end 136 also includes a circumferential notch 70. The circumferential notch 70 is configured to mate with the shape of the extending shoulder section 66 such that the extending shoulder section 66 is insertable into the circumferential notch 70. In this manner of connection, as shown, the circumferential notch 70 and extending shoulder section are in direct contact with each other.

As described previously, a conductive work coil 150 is subjected to a high frequency alternating current. The conductive work coil 150 generates an electromagnetic field of current which subsequently heats the magnetically active ring and melts the sections 72, 74 and 76 that surround the magnetically active ring. Heat is transferred from the sections 72, 74 and 76 to the circumferential notch 70 until it also begins to melt and fuses the circumferential notch 70 and extending shoulder section 66 together. This in turn fuses the bellows member 112 and diaphragm member 114 together.

Figure 6:
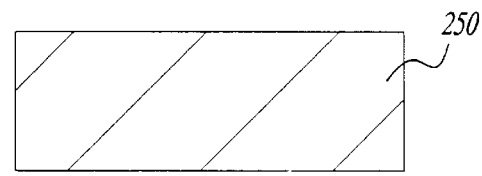
FIG. 6 is a cross-sectional view of another alternative embodiment of the present invention.

Referring now to FIG. 6, there is shown still another alternative embodiment of the present invention. A flexible diaphragm member 112 is shown along with a bellows member 114. The first end 118 of the flexible diaphragm member also includes an extending shoulder section 166. The extending shoulder section 166 has a generally rectangular cross section. The bellows member 114, at second end 136 also includes a circumferential notch 170. The circumferential notch 170 is configured to mate with the shape of the extending shoulder section 166 such that the extending shoulder section 166 is insertable into the circumferential notch 170.

A magnetically active weld paste 71 is shown disposed between the extending shoulder section 166 and the circumferential notch 170. The magnetically active weld paste may be deposited directly on the extending shoulder section 66 or on the circumferential notch 70. The magnetically active weld paste 71 is comprised of a medium of mineral oil base with magnetically active metallic flakes dispersed therein. The magnetically active metallic flakes may be fine particles of iron, stainless steel, or other magnetically active metals. The particles may range in size from 50 microns to 800 microns.

As described previously, a conductive work coil 150 is subjected to a high frequency alternating current. The conductive work coil 150 generates an electromagnetic field of current which subsequently heats the magnetically active weld paste and melts the circumferential notch 70 and extending shoulder section 266. This process of melting and subsequent cooling fuses the circumferential notch 270 and extending shoulder section together. This in turn fuses the bellows member 212 and diaphragm 214 member together.

Figure 7:
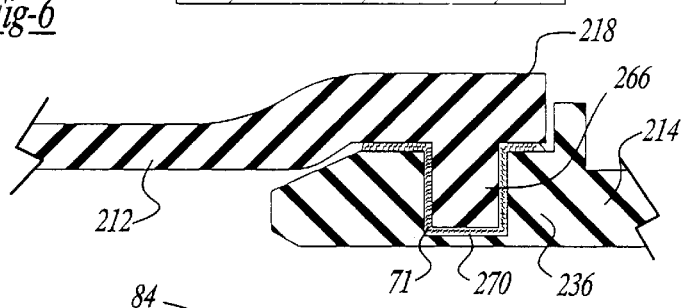
FIG. 7 is a cross-sectional view of yet another alternative embodiment of the present invention.
Figure 7:
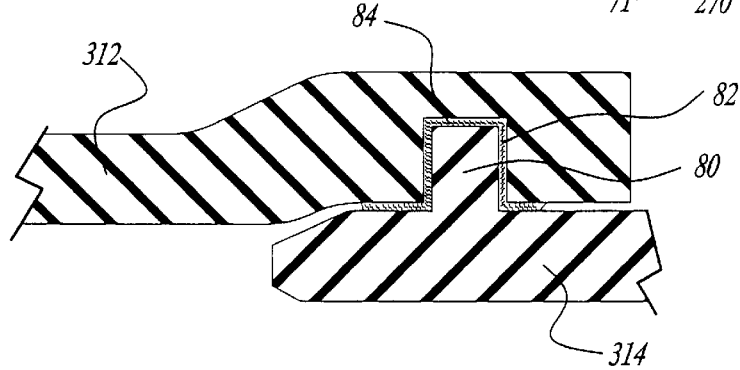
Figure 8:
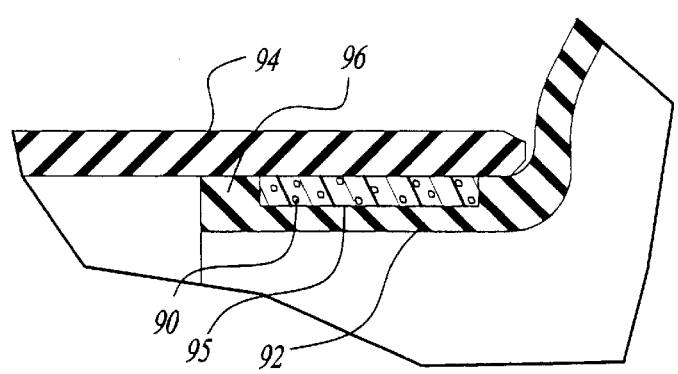
FIG. 8 is a cross sectional view of still another alternative embodiment of the present invention.

FIG. 7 discloses yet another alternative embodiment of the present invention. This embodiment is similar in design and function to the embodiment of FIG. 6, except an extending shoulder section 80 is placed in the bellows member 314. The mating circumferential notch 82 is disposed in the diaphragm member 312 with the magnetically active weld paste 84 disposed therebetween. FIG. 9 discloses yet another alternative embodiment of the present invention similar to FIG. 4, except the magnetically active weld sleeve 90 is disposed within the bellows member 92 instead of in the diaphragm member 94 FIG. 8 discloses yet another alternative embodiment of the present invention. This embodiment is similar in design and function to the embodiment of FIG. 4, except that the magnetically active weld sleeve 90 is correspondingly recessed into the outer surface 95 of the second end 36 of the bellow member 14. In this manner, when operatively connected, as shown in FIG. 8 the magnetically active weld sleeve 90 and the second end 36 of the bellows member 14 are received into the opening 20 of the diaphragm member 12. The magnetically active weld.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A transmission joint sealing boot comprising:
   a flexible diaphragm member having a passageway extending therethrough, a first end defining an opening, an annular second end disposed opposite said first end, a flexible arcuate section connecting said first end and said annular second end of said flexible diaphragm member, said first end further including an inner surface and an outer surface;
   a bellows member having a passageway extending therethrough, said bellows member including a first end defining an opening, a second end disposed opposite said first end, and an intermediate bellows segment having a convoluted section disposed between said first end and said second end and connecting said first end and said second end of said bellows member, wherein said second end defines an opening for receiving said first end of said flexible diaphragm member and said second end further including an inner surface and an outer surface; and
   a magnetically active weld sleeve having an inner surface correspondingly shaped to mate with said outer surface of said first end of said diaphragm member such that said magnetically active weld sleeve is received on and abuts against said outer surface of said first end of said diaphragm member and an outer surface correspondingly shaped to mate with said inner surface of said second end of said bellows member such that said magnetically active weld sleeve and said first end of said diaphragm member are received within said opening of said second end bellows member whereby said magnetically active weld sleeve is disposed between said diaphragm member and said bellows member such that when said magnetically active weld sleeve is exposed to an electromagnetic field of current, the magnetically active weld sleeve melts and subsequently fuses the diaphragm member, the bellows member and weld sleeve together.

2. A transmission as in claim 1 wherein said magnetically active weld sleeve is manufactured from a polymer including embedded particles of a magnetic material.

3. A transmission as in claim 1 wherein said diaphragm member and bellows member are manufactured from a thermoplastic elastomer.

4. A transmission as in claim 1 wherein said diaphragm member, bellows member and magnetically active weld sleeve are all manufactured from a thermoplastic elastomer.

5. A transmission joint sealing boot as in claim 2 wherein said magnetic material is iron.

6. A transmission joint sealing boot as in claim 2 wherein said magnetic material is stainless steel.

7. A transmission joint sealing boot comprising:

a bellows member having a passageway extending therethrough, said bellows member including a first end defining an opening, a second end disposed opposite said first end, and an intermediate bellows segment having a convoluted section disposed between said first end and said second end and connecting said first end and said second end of said bellows member;

a flexible diaphragm member having a passageway extending therethrough, a first end defining an opening, an annular second end disposed opposite said first end, a flexible arcuate section connecting said first end and said annular second end of said flexible diaphragm member, said first end further including an inner surface and an outer surface wherein said opening of said first end receives said second end of said bellows member and said second end further including an inner surface and an outer surface; and a magnetically active weld sleeve having an inner surface correspondingly shaped to mate with said outer surface of said second end of said bellows member such that said magnetically active weld sleeve is received on and abuts against said outer surface of said second end of said bellows member and an outer surface correspondingly shaped to mate with said inner surface of said first end of said diaphragm member such that said magnetically active weld sleeve and second end of said bellows are received within said opening of said diaphragm member whereby said magnetically active weld sleeve is disposed between said diaphragm member and said second end of said bellows member such that when said magnetically active weld sleeve is exposed to an electromagnetic field of current, the magnetically active weld sleeve melts and subsequently fuses the diaphragm member, the bellows member and weld sleeve together.

8. A transmission as in claim 7 wherein said magnetically active weld sleeve is manufactured from a polymer including embedded particles of a magnetic material.

9. A transmission as in claim 7 wherein said diaphragm member and bellows member are manufactured from a thermoplastic elastomer.

10. A transmission as in claim 7 wherein said diaphragm member, bellows member and magnetically active weld sleeve are all manufactured from a thermoplastic elastomer.

11. A transmission joint sealing boot as in claim 8 wherein said magnetic material is iron.

12. A transmission joint sealing boot as in claim 8 wherein said magnetic material is stainless steel.

13. A transmission joint sealing boot comprising:

a flexible diaphragm member having a passageway extending therethrough, a first end defining an opening, an annular second end disposed opposite said first end, a flexible arcuate section connecting said first end and said annular second end of said flexible diaphragm member, said first end further including an extending shoulder section, said extending shoulder section having a magnetically active ring embedded therein;

a bellows member having a passageway extending therethrough, said bellows member including a first end defining an opening, a second end disposed opposite said first end, and an intermediate bellows segment having a convoluted section disposed between said first end and said second end and connecting said first end and said second of said bellows member, wherein said second end includes a circumferential notch configured to mate with and accept the insertion of said extending shoulder section of said flexible diaphragm member; and wherein said magnetically ring is also received within said circumferential notch of said bellows member whereby said magnetically active weld ring is disposed adjacent said diaphragm member and said second end of said bellows member such that when said magnetically active ring is exposed to an electromagnetic field of current, the magnetically active weld ring heats up to at least the fusion temperature of said diaphragm member and said bellows member and subsequently fuses the diaphragm member and the bellows member together.

14. A transmission joint sealing boot as in claim 13 wherein said magnetically active weld ring is a metallic ring.

15. A transmission joint sealing boot as in claim 13 wherein said magnetically active weld ring is an iron ring.

16. A transmission joint sealing boot as in claim 13 wherein said magnetically active weld ring is a stainless steel ring.

17. A transmission as in claim 13 wherein said diaphragm member and bellows member are manufactured from a thermoplastic elastomer.

18. A transmission joint sealing boot comprising:

a flexible diaphragm member having a passageway extending therethrough, a first end defining an opening, an annular second end disposed opposite said first end, a flexible arcuate section connecting said first end and said annular second end of said flexible diaphragm member, said first end further including an extending shoulder section;

a bellows member having a passageway extending therethrough, said bellows member including a first end defining an opening, a second end disposed opposite said first end, and an intermediate bellows segment having a convoluted section disposed between said first end and said second end and connecting said first end and said second end of said bellows member, wherein said second end includes a circumferential notch configured to mate with and accept the insertion of said shoulder section of said flexible diaphragm member; and a magnetically active weld paste disposed within said circumferential notch of said bellows member whereby said magnetically active weld paste is disposed between said diaphragm member and said bellows member and directly contacts said extending shoulder section and said circumferential notch such that when said magnetically active weld paste is exposed to an electromagnetic field of current, the magnetically active weld paste heats up to at least the fusion temperature of said diaphragm member and said bellows member and subsequently fuses the diaphragm member and the bellows member together.

* * * * *